W. R. PRUITT.
COMBINED COTTON CHOPPER AND ROW CLEANER.
APPLICATION FILED MAY 20, 1908.
921,886.
Patented May 18, 1909.
2 SHEETS—SHEET 1.
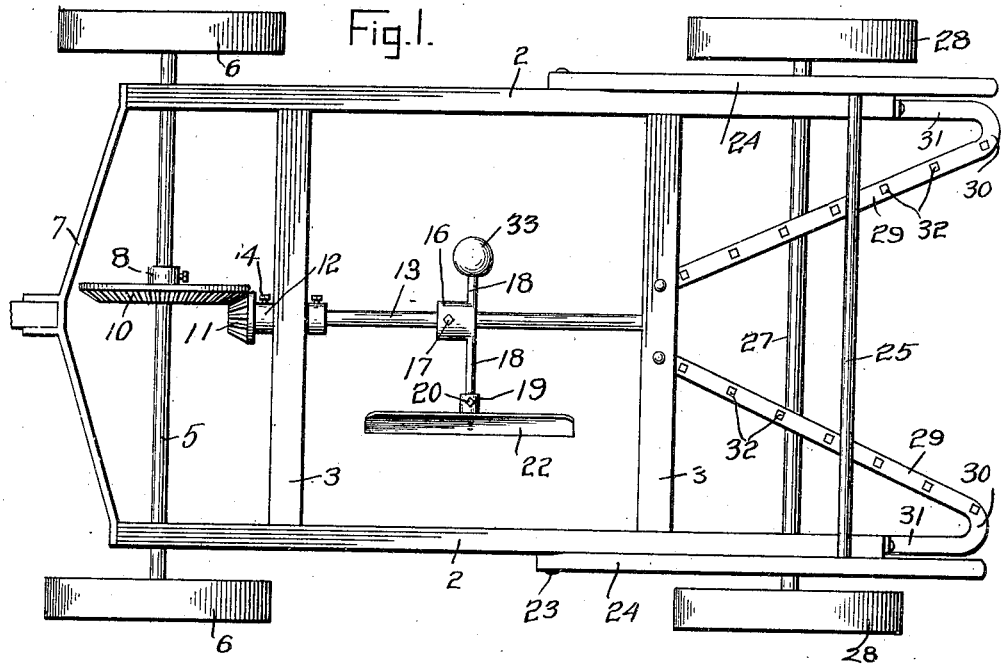
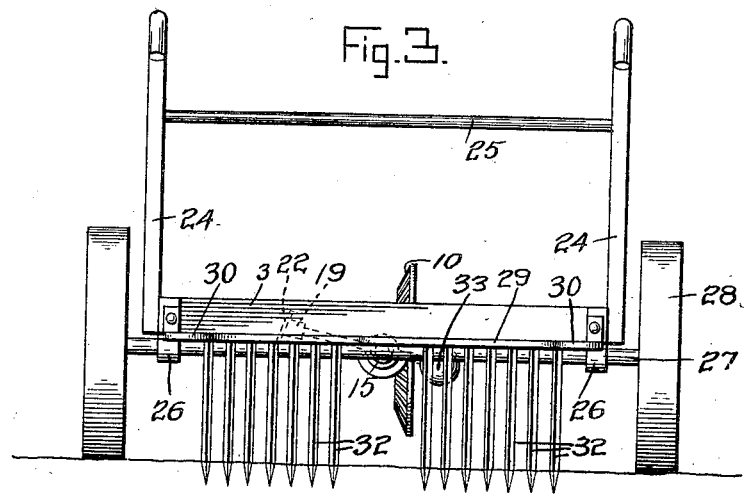
Witnesses
C. K. Reichenbach
F. O. Pauliser
Inventor
William R. Pruitt.
By Chandler & Chandler
Attorneys.

W. R. PRUITT.
COMBINED COTTON CHOPPER AND ROW CLEANER.
APPLICATION FILED MAY 20, 1908.
921,886.
Patented May 18, 1909.
2 SHEETS—SHEET 2.
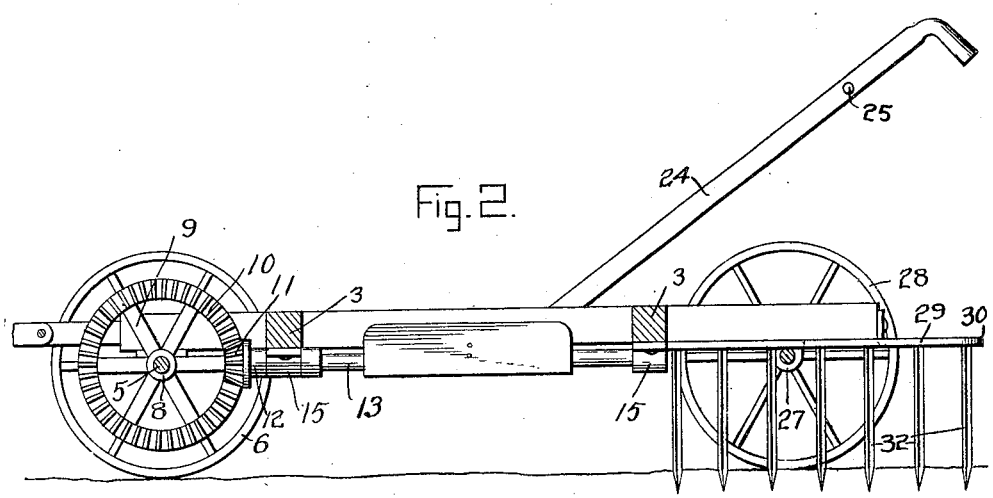
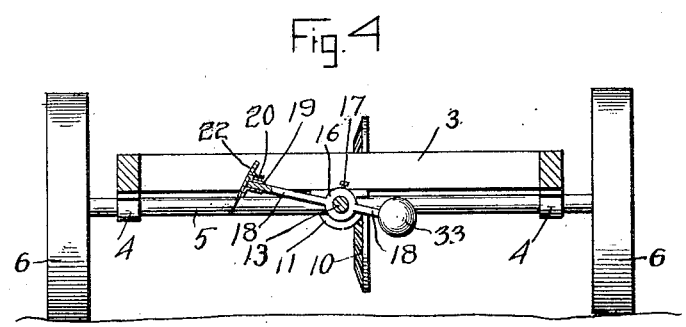
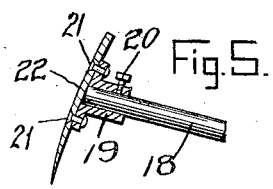
Inventor
William R. Pruitt
Witnesses
Attorneys

UNITED STATES PATENT OFFICE.

WILLIAM R. PRUITT, OF TALLASSEE, ALABAMA.

COMBINED COTTON-CHOPPER AND ROW-CLEANER.

No. 921,886.  Specification of Letters Patent.  Patented May 18, 1909.

Application filed May 20, 1908. Serial No. 433,926.

*To all whom it may concern:*

Be it known that I, WILLIAM R. PRUITT, a citizen of the United States, residing at Tallassee, in the county of Elmore, State of Alabama, have invented certain new and useful Improvements in Combined Cotton-Choppers and Row-Cleaners; and I do hereby declare the following to be a full, clear, and exact description of the invention, such as will enable others skilled in the art to which it appertains to make and use the same.

The invention has relation to a cotton chopper and more particularly to the class of combined cotton chopper and row cleaner.

The primary object of the invention is the provision of a chopper having a rotatable shaft journaled longitudinally of a wheeled frame which chopper is actuated through the medium of the wheels of the frame so that the chopper will rotate about the said shaft transversely of the same and mounted rearwardly of the chopper upon the said frame are inwardly converging supports having depending teeth so that upon advanced movement of the wheeled frame these teeth will disperse the cut plants laterally to opposite sides of the cotton row after the same has been thinned out by the said chopper.

Another object of the invention is the provision of a combined cotton chopper and row cleaner having a wheeled frame for supporting an adjustable cotton chopper mounted upon a shaft journaled longitudinally of the frame and which shaft is actuated through the medium of gearing by the wheels of the frame whereby the cotton chopper blade will be caused to rotate about the said shaft transversely of the frame and which latter supports at its rear extremity a cleaner structure so positioned whereas the cut plants will be thrown to opposite sides of a cotton row during the operation of the machine.

A further object of the invention is to provide a combined cotton chopper and row cleaner of a character which is simple, efficient, durable and comparatively inexpensive in the manufacture.

With these and other objects in view the invention for example, consists in the construction, combination and arrangement of parts which will be hereinafter more fully described and as illustrated in the accompanying drawings disclosing the preferred embodiment of the invention, however, changes, variations and modifications will be resorted to, such as come properly within the scope of the claims hereunto appended, without departing from the spirit of the invention.

In the drawings:—Figure 1 is a top plan view of the invention. Fig. 2 is a longitudinal sectional view of the same. Fig. 3 is a rear end view. Fig. 4 is a transverse sectional view. Fig. 5 is a fragmentary view partly in section of the blade and its arm.

Similar reference characters indicate corresponding parts throughout the several views in the drawings.

In the drawings the numeral 2 designates the side bars of a main or supporting frame of the machine and which side bars are connected by transverse cross beams or bars 3 which latter are arranged a distance removed from the front and rear extremities of said side bars. Upon the underface near the front end of each side bar 2 are secured axle bearings 4 which receive a rotatable front axle 5 having secured thereto at opposite ends in any suitable manner wheels 6 which form the main driving wheels for the cotton chopper hereinafter described. Secured to the front ends of the side bars 2 is a draft pole attaching bar 7 which may be of any usual or conventional form and to which the draft animals may be connected for advancing or transporting the machine over a field for cultivating operation.

At a point intermediate the side bars 2 and upon the front axle 5 is secured a hub 8 having radial spokes 9 which support a beveled driving gear 10 in mesh with a beveled pinion 11 having a collar 12 surrounding a driven shaft 13 at one end thereof and secured to the latter by a set screw 14. The driven shaft 13 extends longitudinally of the main frame and is supported centrally thereof in bearings 15 secured to the underside of the cross bars or beams 3 of the main frame.

Longitudinally movable on the driven shaft 13 is a collar or cuff 16 surrounding the said shaft and which carries a set screw 17 for locking said collar or cuff 16 in adjusted positions throughout a portion of the longitudinal length of said driven shaft. Projecting outwardly from the collar or cuff 16 at right angles to the driven shaft 13 and in parallel relation or alinement with each other are extensions forming arms 18 one of which carries at its free end an adjustable collar or sleeve 19 having a set screw 20 for adjustably securing the said sleeve on the arm 18. The sleeve 19 is secured by rivets 21 to a curved cutter blade or hoe 22 and upon the operation of the latter due to the curvature thereof the same has a tendency to throw the dirt from the row of the cotton plant.

To the side bars 2 are secured by bolt fasteners 23, rearwardly extending inclined handle bars 24 connected near their upper end by a transverse rung 25 and which are of the usual construction.

Near the rear ends of the side bars 2 and secured to the underface thereof are axle bearings 26 in which is journaled the rear axle 27 having fixed thereto at opposite extremities rear wheels 28 in any suitable manner.

Secured to the underface of the rearmost cross bar or beam 3 are inwardly converging supports 29 having their opposite ends curved outwardly and rearwardly as at 30 to form extensions 31 which are secured to the extremities of the side bars 2. Depending from the supports 29 and arranged at suitable intervals apart are teeth 32 which latter catch up the cut plants from the row of cotton and disburse said cut plants to opposite sides of the main frame and also to one side of the row. Primarily, these teeth 32 are adapted to clean the cut plants from the row, however, said teeth are shown slightly extending into the ground to break lumpy earth as the cotton chopper advances over the row to be cultivated. On the outer end of the arm 18 opposite the corresponding arm carrying the cutter blade or hoe 22 is an enlarged portion 33 forming a weight to form an equalizer or counterbalance and to assist in the revolving action of the said hoe.

What is claimed is—

1. The combination with a wheel frame, of a rotatable shaft longitudinally disposed centrally of the frame, a cotton chopper fixed to said shaft and in spaced relation thereto, a row cleaner carried by the frame in rear of the chopper, the row cleaner comprising bars converging inwardly toward each other and having their inner ends terminating at a mutually adjacent point opposite sides of the longitudinal axis of said shaft, and closely arranged teeth carried by and depending from said bars, the said teeth being disposed in diagonal rows across the path of the cutting action of said chopper to disperse cut plants outwardly to opposite sides of the frame.

2. The combination with a frame having a rotatable chopper, of a row cleaner in rear of the chopper and having rows of depending teeth, each row of teeth being disposed at one side of the axis of rotation of the chopper and converging inwardly toward each other, the inner ends of the rows terminating in spaced relation to each other to permit the passage of standing plants therebetween and also to disperse cut plants outwardly to opposite sides of the frame.

In testimony whereof, I affix my signature in presence of two witnesses.

WILLIAM R. PRUITT.

Witnesses:
  GEO. D. PATTERSON,
  C. G. PRINCE.